(12) United States Patent
Catrein et al.

(10) Patent No.: US 8,726,406 B2
(45) Date of Patent: May 13, 2014

(54) CONTROLLING A USAGE OF DIGITAL DATA BETWEEN TERMINALS OF A TELECOMMUNICATIONS NETWORK

(75) Inventors: Daniel Catrein, Würselen (DE); Emmanuel Courbier, Paris (FR); Frank Hartung, Herzogenrath (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 326 days.

(21) Appl. No.: 12/746,462

(22) PCT Filed: Aug. 11, 2008

(86) PCT No.: PCT/EP2008/060504
§ 371 (c)(1),
(2), (4) Date: Jun. 4, 2010

(87) PCT Pub. No.: WO2009/071349
PCT Pub. Date: Jun. 11, 2009

(65) Prior Publication Data
US 2010/0263053 A1 Oct. 14, 2010

Related U.S. Application Data

(60) Provisional application No. 61/043,212, filed on Apr. 8, 2008.

(30) Foreign Application Priority Data

Dec. 6, 2007 (WO) ................. PCT/EP2007/010598

(51) Int. Cl.
*H04L 29/06* (2006.01)
*G06F 15/16* (2006.01)

(52) U.S. Cl.
USPC ........................................... 726/30; 713/168

(58) Field of Classification Search
None
See application file for complete search history.

(56) References Cited

U.S. PATENT DOCUMENTS 6,449,719 B1 * 9/2002 Baker ........................... 713/168
7,251,832 B2 * 7/2007 Venters et al. ................. 726/26
7,706,534 B2 * 4/2010 Saarikivi ...................... 380/233

(Continued)

FOREIGN PATENT DOCUMENTS

JP    A 2004-070590    3/2004
WO    WO2006/117555 A    11/2006

OTHER PUBLICATIONS

Cheun Ngen Chong et al:, "License Transfer in OMA-DRM" Computer Security—ESORICS 2006 Lecture Notes in Computer Science; ;LNCS, Springer, Berlin, DE, vol. 4189, Jan. 1, 2006, pp. 81-96.

(Continued)

*Primary Examiner* — Christopher Revak

(57) ABSTRACT

A method and control of using a content data object associated to a content controlling terminal of a communications network, and receiving a request from a content receiving terminal to get a digital rights data object associated to the content data object, that is required to use the content data object, and initiating a transmission of the digital rights data object from the content controlling terminal to the content receiving terminal, and a control supporting server thereto. Also generating the digital rights data object, receiving a notification to send the digital rights data object to the content receiving terminal, and sending the digital rights data object to the content receiving terminal, and a content, controlling terminal thereto.

16 Claims, 2 Drawing Sheets

(56) References Cited

U.S. PATENT DOCUMENTS

| | | | |
|---|---|---|---|
| 7,757,101 B2* | 7/2010 | Nonaka et al. | 713/194 |
| 7,810,162 B2* | 10/2010 | Lee et al. | 726/27 |
| 8,196,208 B2* | 6/2012 | Kim et al. | 726/26 |
| 2006/0034321 A1* | 2/2006 | Paila et al. | 370/464 |
| 2007/0061568 A1* | 3/2007 | Lee et al. | 713/163 |
| 2007/0116287 A1* | 5/2007 | Rasizade et al. | 380/258 |
| 2007/0116288 A1* | 5/2007 | Rasizade et al. | 380/258 |
| 2009/0041242 A1* | 2/2009 | Yang et al. | 380/255 |
| 2009/0158437 A1* | 6/2009 | Kim et al. | 726/26 |
| 2010/0131411 A1* | 5/2010 | Jogand-Coulomb et al. | 705/54 |
| 2010/0131774 A1* | 5/2010 | Jogand-Coulomb et al. | 713/193 |
| 2010/0131775 A1* | 5/2010 | Jogand-Coulomb et al. | 713/193 |
| 2010/0138673 A1* | 6/2010 | Jogand-Coulomb et al. | 713/193 |
| 2010/0218001 A1* | 8/2010 | Rasizade et al. | 713/189 |
| 2012/0159644 A1* | 6/2012 | Rasizade et al. | 726/27 |
| 2013/0054965 A1* | 2/2013 | Catrein et al. | 713/167 |
| 2013/0125014 A1* | 5/2013 | Sharif-Ahmadi et al. | 715/748 |
| 2013/0125157 A1* | 5/2013 | Sharif-Ahmadi et al. | 725/14 |

OTHER PUBLICATIONS

OMA DRM WG: "DRM Specification, Candidate Version 2 0, OMA-TS-DRM-DRM-V2_0-20050908-C" Internet Citation, [Online] XP002442966 Retrieved from the Internet: URL:http://member.openmobilealliance.org/ftp/Public_documents/DRM/Permanent_documents/OMA-TS-DRM-DRM-V2_0-20050908C.zip> [retrieved on Jul. 17, 2007] pp. 17-56.

OMA DRM WG: "DRM Specification, Candidate Version 2.0, OMA-TS-DRM-V2_0-20050908-C" Internet Citation, [Online] XP002442966 Retrieved from the Internet: URL:http://member.openmobilealliance.org/ftp/Public_documents/DRM/Permanent_documents/OMA-TS-DRM-DRM-V2_0-20050908C.zip>[retrieved on Jul. 17, 2007] pp. 17-56.

* cited by examiner

CONTROLLING A USAGE OF DIGITAL DATA BETWEEN TERMINALS OF A TELECOMMUNICATIONS NETWORK

This application claims the benefit of U.S. Provisional Application No. 61/043,212, filed Apr. 8, 2008, and International Application No. PCT/EP2007/010598, filed Dec. 7, 2010 the disclosure of which is fully incorporated herein by reference.

TECHNICAL FIELD

The present invention relates to a usage control of digital data by a management of digital rights.

BACKGROUND

User terminals like personal computers, laptop computers, or mobile phones are developing from specialized devices, e.g. computing devices or telephony devices to so-called multimedia devices that provide a multitude of services. Mobile phones are already available that offer, additionally to traditional telephony services, data services e.g. Web browsing, Multimedia Messaging Services (MMS), MP3 music playback, video streaming, and mobile gaming. Furthermore, with the introduction of integrated or attachable cameras, such user devices are capable of generating and managing picture files and/or video files. With the increasing capability of generating and managing own digital data, the wish to exchange such data among user devices increases accordingly.

Without an efficient measure of protection, digital data can be extensively used by any recipient, e.g. being copied, modified and/or distributed arbitrary further recipients. Thus, there is a wish to protect digital data being distributed to recipients from defined unauthorized use. For such protection, so-called Digital Rights Management (DRM) technologies have been created, which refers to protection and usage control of multimedia data.

One of such DRM technologies has been proposed by the Open Mobile Alliance (OMA), a standardization organization in the field of mobile communication that addresses DRM within mobile networks. The Open Mobile Alliance has developed a series of open standards (being available under the web address http://www.openmobilealliance.org), hereunder a standard named "OMA Digital Rights Management V1.0", in the following being referred to as OMA DRM 1.0, and a further standard named "OMA Digital Rights Management V2.0", in the following being referred to as OMA DRM 2.0. These standards focus on the protection of data delivered from content owners and service providers, actually preventing recipient users from an unauthorized use of received content. OMA DRM 2.0 can be regarded as an extension to OMA DRM 1.0, addressing a protection of the exchanged information between the user devices and the providers.

OMA DRM 1.0 provides the ability to associate rights to the content data object (e.g. to prevent downloaded content from being forwarded or copied to further users, also being referred to as Forward-Lock). This can be achieved either by directly combining a rights object with a content object (Combined Delivery mode) or by first distributing the content object and then sending an associated rights object (Separate Delivery mode).

For Separate Delivery—SD—, generally the content (e.g. a media object) is protected by encryption (into a DRM content format—DCF—), e.g. using symmetrical encryption techniques according to the so-called Advanced Encryption Standard (AES). The decryption key, needed to render or obtain the content, is put in the rights object which may also contain definitions of usage rights for the obtained content. Such usage rights might comprise permissions (e.g. "play", "display", "execute", "print") and constraints (e.g. "count", "datetime", "interval") thus expressing what the recipient is allowed to do with the content. Thus, this rights object governs the consumption of the associated content.

Technically, a usage of the content within the granted rights is ensured by a DRM Agent being realized within the user devices. Once the DRM content is received by the device, the DRM Agent enforces the associated usage rights, e.g. preventing the user from unauthorized forwarding, or from modifying DRM content or rights. The OMA DRM standards, especially OMA DRM 1.0, are supported by a considerable number of current mobile phones.

While OMA DRM standards has been defined to enable content providers to control the distribution and consumption of their content based on the classical client-server architecture, they do not consider a use control of content amongst the terminals on a peer-to-peer level.

SUMMARY

It is an object of the present invention to improve the digital rights management.

It is an idea of the invention to allow a control of usage of digital data on a peer-to-peer (P2P) level i.e. by exchanging corresponding control data between user devices or terminals of a communications network (without using or changing the control data at any intermediate network node or server), while the exchange of the content data might be controlled, administered and/or supported by one or a plurality of servers of the communications network. In other words, the content owning peer (e.g. the peer having created the content and/or having the rights to use and distribute the content is able to directly control the use of that content by a recipient peer.

Each of the peers or terminals can be a personal computer, a laptop, a mobile phone, or a smart phone or the like. The terminals may comprise a transmission unit, a processing unit, a sending unit for sending messages and a receiving unit for receiving messages. The processing unit (in collaboration with some further units) might be adapted to obtain the content, to set at least one usage right specifying one or more usage restrictions and/or one or more usage permissions of the content at the recipient device, to generate integrity protection information for the at least one defined usage right, and/or to encrypt the content with a content encryption key. Examples for the content data are photos, video, audio, text files or any compositions of such files. The content data object might be generated by the content controlling terminal or device itself by embedding generated content into a certain data structure. Alternatively the content data object might be generated by a terminal or any device associated to the content controlling terminal, e.g. by a device of the same user.

In a further embodiment, the content controlling terminal, also being referred to as first or sending user device, generates both a content data object comprising the digital content data and a digital rights data object associated to the content data object, wherein digital rights data object is required to use the content data object at a content receiving terminal, also being referred to as second or receiving user device. The digital rights data object comprises a definition of rights that are granted to the receiving user with respect to the content. In an easy example, the rights object might comprise a decryption key to decrypt the content data object without any further restrictions. In this example, the user of the content controlling terminal takes a decision, whether the requesting user should be allowed to use the content or not, and correspondingly only provides the digital rights object, if the decision was positive. In another example, the rights object might comprise one or a plurality of usage definitions that have to be adhered to by the second user device.

This embodiment allows a usage control directly by the user terminals. The supporting server is used for any support, but the user does not give up any control to this server that might not be well trusted. This allows any publishers or copyright holders of digital media data to directly and transparently control the usage of this data.

In a further embodiment, a control supporting server is provided. Thereto, this server receives a request from a requesting user of the content receiving terminal to get the digital rights object associated to the content data object (this object might have been received before by any means, e.g. by means as discussed below). In response to the reception of this request, this server initiates a transmission of the digital rights data object from the content controlling terminal to the content receiving terminal, e.g. by directly transmitting a request notification to the content controlling terminal.

In a further embodiment, the content data object being received by the recipient device comprises information about the address of the control supporting server to be contacted for sending the request to get the digital rights data object.

In a further embodiment, for allowing or facilitating the content receiving terminal to download the content object (i.e. to provide a link or address information), the content controlling terminal sends a download description comprising such information to the content receiving terminal. Such information might further comprise a description of the type, size and coding of the content data In a further embodiment, the request received by the supporting server comprises an address information of the content controlling terminal to be contacted, e.g. a telephone number, and an information identifying the requested digital rights data object, so that the content controlling terminal is able to provide the content receiving device with the appropriate digital rights abject associated to the content data abject.

In a further embodiment, the request received by the supporting server comprises information about the receiving device, e.g. its IP address, which is used by the supporting server to retrieve further information about the receiving device form the network, e.g. its phone number, user identity (name etc.). This information is forwarded, e.g. added to the request, to the content controlling terminal that may be used therein to contact the other device and/or to display (parts of) the information to the user.

In a further embodiment, a server storing or managing the content data object being received from the content controlling terminal (this server might be the same server as the control supporting server, but can alternatively be any different server) receives a content download request for sending the content data object to the content receiving terminal. This request might be received from the content receiving terminal itself, from the content controlling terminal, or from any other user device associated to the sending user or the receiving user. This embodiment allows using a broadband communication channel, e.g. via broadband network nodes that are not necessarily part of a secure network. Thus, secure per-to-peer control of content is provided without the need to deliver the whole content over a secure, (but possibly narrow) direct communication channel (e.g. SMS or MMS) between the peers.

In a further embodiment, a content controlling user terminal is provided for controlling a usage of a content data object of the content receiving device that corresponds to the control supporting server as described above. Thereto, this terminal performs the steps of generating a digital rights data object, receiving a notification to send the digital rights data object to the content receiving terminal, and sending the digital rights data object to the content receiving terminal.

In a further embodiment, the content is being encrypted by the content controlling terminal or a device associated to the content controlling terminal. Correspondingly, the content controlling terminal inserts a corresponding decryption key into the digital rights data object for decrypting the content to be used in the content receiving terminal, e.g. using symmetrical encryption according to the so-called Advanced Encryption Standard (AES).

In a further embodiment, the encrypted content is decrypted with the content encryption key in a secure environment of the recipient device. The secure environment can be a hardware security module comprised by the user device and/or a security application operated on the user device, which protects the usage of the content for the user device according to the defined usage rights for that content. A usage of the content that is not in conformity with the defined usage rights is not permitted at the recipient device, e.g. content or parts thereof may not be transferred out of the secure environment if not permitted by a usage right.

In a further embodiment, the control mechanisms as described above are based on functions and messages defined in OMA DRM 1.0, thereby extending the Separate Delivery of OMA DRM 1.0. This allows for using any OMA DRM V1.0 compliant devices as a recipient terminal that will, upon reception of a content data object (being coded as a digital rights management—DRM—content format—DCF) starts to acquire the associated rights object using information encoded into the content data object.

In a further embodiment the decryption key inserted into the digital rights object is encrypted, in order to avoid any misuse of this object. The encryption might be performed by means of a public key of the content receiving device.

In a further embodiment, the public key of the content receiving terminal therein is generated on the base public information about this terminal, e.g. on the base of the terminals telephone number or email address. This embodiment has the advantage that the encryption and/or authentication of the data does not need any prior certificate exchange.

In a further embodiment, the control supporting server for supporting the control of using the content data object being associated to a content controlling terminal (wherein being associated can be regarded in way that the user of the content controlling terminal has (certain) usage rights (e.g. the so-called copyright, or the right to grant usage rights) with respect to the content data) comprises a receiver for receiving the request from a content receiving terminal to get a digital rights data object associated to the content data object being required to use the content data object, and initiating means (e.g. a transmitter adapted to be connected to the terminals) for initiating a transmission of the digital rights data object from the content controlling terminal to the content receiving terminal.

In a further embodiment, the content controlling terminal for controlling the usage of a content data object to be received by a content receiving terminal, comprises a generator for generating the digital rights data object being associated to the content data object, a receiver for receiving the notification to send the digital rights data object to the content receiving terminal, and a sender for sending the digital rights data object to the content receiving terminal.

The present invention also concerns computer programs comprising portions of software codes in order to implement the method as described above when operated by a respective processing unit of a user device and a recipient device. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1A:
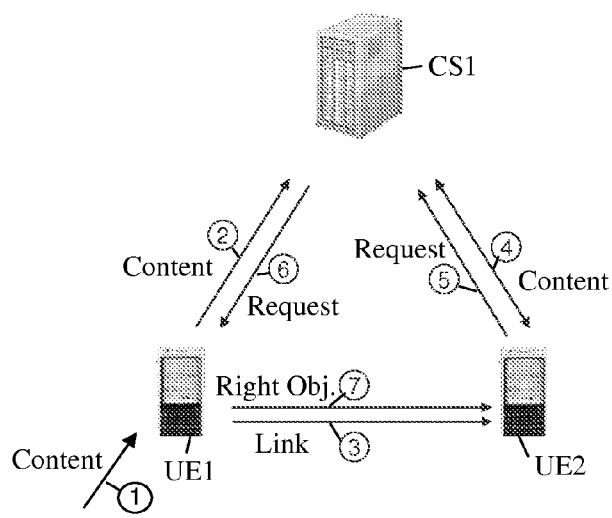
FIG. 1a shows a first exemplary embodiment for a control of content usage, depicting exemplary messages between a content controlling terminal, a recipient device and a content server.

FIG. 1a shows an example of for the control of content usage comprising a content controlling user device, also being referred to as sending user device or first user device UE1, a content receiving terminal, also being referred to as recipient user device or second user device UE2, and a first server CS1. The first user device UE1 receives a digital content from any external or internal local storage, e.g. from a device associated to, connected to, or integrated into the user device UE1, such as a photo camera, generates an corresponding content object and transmits this object via the first server CS1 to the second user device UE2, while the associate rights object is exchanged directly between the first and the second user device UE1 and UE2.

An exemplary message exchange between the first user device UE1, the second user device UE2 and the first server CS1 is shown below:

In a first step, the first user device UE1 receives a first message 1. Alternatively, the first user device UE1 might have generated the content itself, e.g. by means of an integrated camera. The first user device UE1 generates a DRM Content Format—DCF—object and the associated Rights Object—RO—; additionally, a so-called Download Descriptor—DD—might be generated comprising a link pointing to the DCF.

In a second step, by sending a second message 2, the first user device UE1 uploads the DCF and the DD to the first server CS1. Alternatively, the link to the DCF or the DD may be generated by CS1 and be sent back to the first user device UE1 within this step.

In a third step, the first user device UE1 sends a third message 3, e.g. by means of a message according to the short message service (SMS) being offered both in wireline and radio telecommunications, containing a link to the DCF or the DD to the second user device UE2.

In fourth step, the second user device UE2 contacts the first server CS1 e.g. by means of the DD or directly by means of the link, to get the DCF with a fourth message 4.

In a fifth step, the second user device UE2 sends a fifth message 5 to request the RO associated to the DCF from the first server CS1, e.g. by using a Uniform Resource Locator—URL—specified within the DCF (e.g. within a so-called "Rights-Issuer" field of the DCF).

In a sixth step, the server CS1 forwards the request to the first user device UE1 with a sixth message 6, e.g. per SMS text message; additionally, the server CS1 might further forward or add information about the second or receiving user device UE2 e.g. the telephone number of the device UE2.

In a seventh step, the first user device UE1 sends the requested RO with a seventh message 7 to second user device UE2, e.g. by means of a WAP Push SMS containing the RO.

Alternatively to generating the associated RO already within the first step, this object might be generated later-on until the seventh step, e.g. with or after the sixth step. The rights in the RO may be subject to information obtained in the previous messages, e.g. in step 6. Additionally, the user may be asked for input presenting the information received in the previous steps (e.g. by a window appearing on the display of UE1 asking to grant a permission to access the content).

The content control within the first user device UE1 might be supported by a content controlling agent integrated within the first user device UE1, e.g. being realized as a program being controlled by a CPU of the first user device, and in the following also being referred to as DRM program. This program might specifically support the user to select a digital content, in the following also being referred to as multimedia content that can be any perceivable (e.g. audible, visual, audio-visual, or legible) document. The multimedia content therein can e.g. be one or a plurality of photographs, a movie, a voice or music file, a text document, or any combination thereof.

After or in conjunction with receiving or selecting the content, the user of the first user device UE1 might manually define usage rights for the content with respect to the user of the second user device UE2. Alternatively, such definition can be automatically performed by using default values e.g. being defined each for specific groups of recipient users. The usage rights might comprise one or a plurality of usage restrictions and/or usage permissions, or any combination of permission and restrictions. Examples for permissive usage rights are: View, Play, Forward, Duplicate, Print, Copy, Modify, and Synchronize, Examples for permissive usage rights are: binding to defined purposes (Purpose Binding), Temporal Restriction, and a limitation of the number of allowed usages. "Display", "Play" or "Execute assign the right for the recipient user to consume the content, e.g. displaying a video content on a screen or play of the device or playing an audio content by means of a loudspeaker, "Forward" to forward the content to a further device, "Print" to print out the content from a device at a printer, or "Export" to convey the content to another device wherein the content might be protected by other means than those of the exporting device.

"Purpose binding" can be used to restrict the usage of the content according to a specified purpose or specific application, e.g. to allow content to be used for charging but not for other purposes. A "temporal restriction" can be used to restrict a usage time or usage time interval for the content, and the number of usages for the content can be restricted by "count".

Figure 1B:
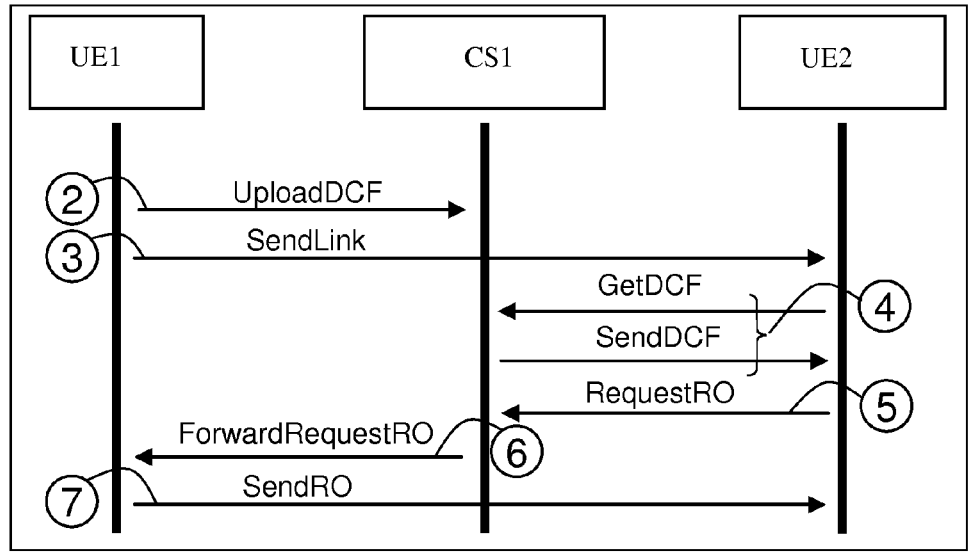
FIG. 1b shows an exemplary protocol sequence according to FIG. 1.

Referring now to FIG. 1b, the steps discussed under FIG. 1a are explained by means of a sequence diagram of the messages 2-7, being specifically tailored for OMA DRM 1.0.

After having received or selected a multimedia content (SelectContent) and having defined usage rights for this content (DefineRights), the DRM program generates the DCF and the associated RO (and possibly the DD) (GenerateDRM).

The DRM program on the first user device UE1 uploads the DCF (and the DD) to the first server CS1 (UploadDRM) by sending the second message 2 (UploadDCF). The first server CS1 handles this message (HandleUploadDRM) and saves the DCF (and the DD).

The DRM program on the first user device UE1 sends the link to the DCF (or DD) to the second user device UE2 (SendURL) by sending the third message 3 (SendLink).

The second user device UE2 gets the DCF (either directly or by means of the DD) by sending the fourth message 4, upload direction, (getDCF or GetDD) to the first server CS1, which in turn sends the DCF (SendDCF) or DD (SendDD) with the fourth message 4, download direction, to the second user device UE2. If the second user device UE2 gets the DD, user device UE2 downloads the DCF by means of the DD (e.g. comprising a link to the DCF).

The DRM Agent requests the RO by sending the fifth message 5 (RequestRO) to the first server CS1 using the URL specified in the "Rights-Issuer" field of the DCF.

The first server CS1 handles (HandleRequestRO) the fifth message 5 (RequestRO), and forwards the RO request to the first user device UE1 (ForwardRO) by sending the sixth message 6 (ForwardRequestRO) to the first user device UE1. According to the discussion above, the first server CS1 might send information about the receiving device UE2 in addition.

The DRM program on the first user device UE1 handles (HandleRequestRO) the sixth message (ForwardRequestRO), and pushes the RO to the second user device UE2 (PushRO) by sending the seventh message 7 (SendRO) to the second user device UE2. The DRM Agent on the second user device UE2 handles this message and enforces the usage rights for the DCF.

Description of parameters discussed above:

ROID: (random) ID for the RO which may contain the address of the recipient user UE2 (e.g. phone number). For example, ROID:=RecipientAddress:RandomNumber RequestROID: can be matched to the address of the first user (e.g. by constructed it from phone number and the ROID by concatenation). For example, RequestROID:=SenderAddress:ROID DCF: DRM Content Format containing the encrypted content as defined in OMA DRM 1.0 (DRM content format specification). The "Rights-Issuer" element of the "Headers" field comprises a URI pointing to the first server CS1. Additionally, the URI may comprise an information about or reference to ROID or Request ROID.

DD: Download Descriptor associated to the DCF.
DDURL: URL of the uploaded DD on the first server CS1.
Example Messages:
UploadDCF: HTTP/POST request to upload the DCF to the HTTP. server.
→Parameter: DCF
SendLink: SMS containing the URL of the DCF.
→Parameter: DCFURL
GetDCF: HTTP/GET request to download the DCF.
→Parameter: DCFURL
SendDCF: HTTP response that contains the DCF.
→Parameter: DCF
RequestRO: HTTP/GET request to request the RO.
→Parameter: RequestROID
ForwardRequestRO: SMS sent to the sender phone number
→Parameter: ROID
SendRO: WAP Push SMS that contains the RO
→Parameter: RO Referring to the receiving user device UE2, no specific implementations are necessary, provided that the device UE2 supports OMA DRM 1.0.: The functions of GetDD and SendDD (4th step) just result from the recipient user browsing through the Internet, e.g. by using the URL of the DCF or DD contained in the SendLink message (SMS) or by means of so-called WAP Push methods. The function of sending the RequestRO (5th step) is already implemented by the DRM Agent according to OMA DRM 1.0.

Figure 2:
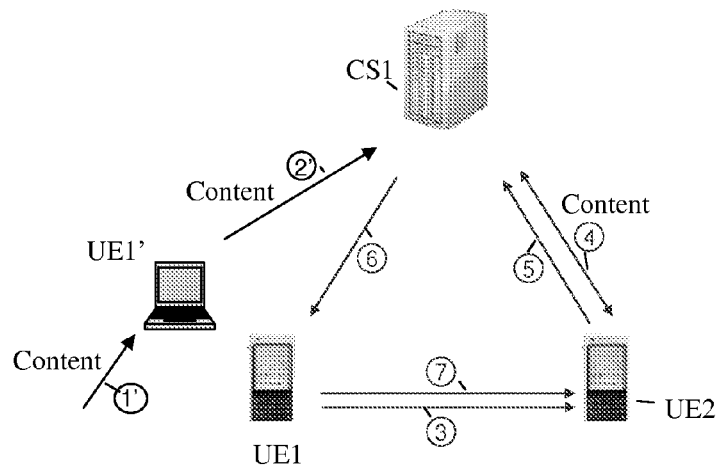
FIG. 2 shows a second exemplary embodiment for the control of content usage.

FIG. 2 shows a second exemplary embodiment for the control of content usage. Additionally to FIG. 1a, a further user device UE1' is shown, wherein this user device is associated to the same user of the first user device UE1. Such further user device might be a personal computer or any other computer device being able to communicate with the first server (e.g. via the internet and by means of the HTTP). In a step corresponding to the first step of FIG. 1a, the digital data is sent to the further user device UE1', with (message 1'); alternatively this data might have been generated within the device, so that this step might be omitted. In the next step corresponding to step 2 of FIG. 1a, the further user device UE1' generates the DCF object to be sent to the first server. The further steps might be performed similar to steps 3-7 as discussed under FIG. 1a.

The first user device UE1 and the further user device UE1' might be connected by means of a local interface (e.g. by means of a Bluetooth or infrared connection) to exchange control information. In a case that the further user device UE1' generated the rights object too, this interface might be also used to convey the rights object to the first user device UE1.

Figure 3:
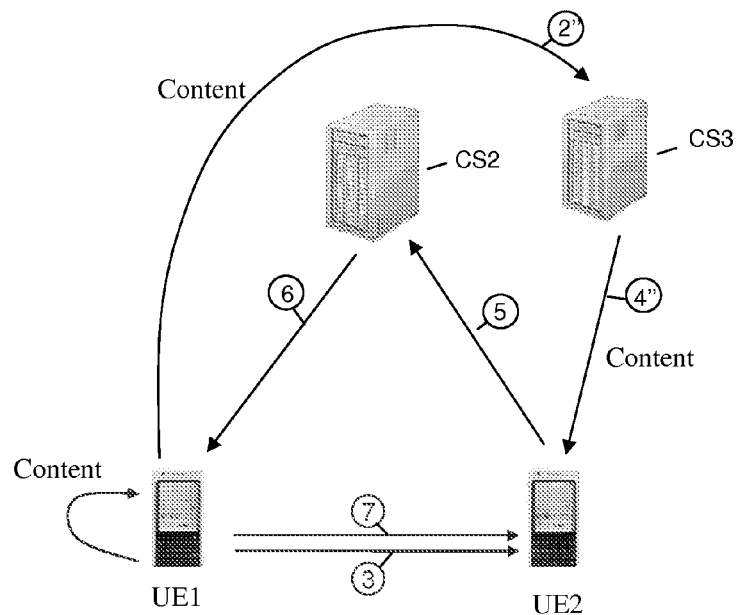
FIG. 3 shows a third exemplary embodiment for the control of content usage.

FIG. 3 shows a third exemplary embodiment for the control of content usage. Instead of the first server CS1, a second server (or DRM supporting server) CS2 and a third server (or content managing server) CS3 is shown that share the tasks of the first server CS1: while the second server CS2 comprises the functions to supporting the usage control of the content object, the third server CS3 comprises the functions of managing a convey of the content object from the sending user to the receiving user (e.g. by managing an upload, a storage and a download of the content). Thereto, in a step corresponding to the second step of FIG. 1a, the first user device UE1 uploads the DCF (that has generated the content data by itself according to the example shown in FIG. 3) (and the DD) to the third server CS3 by sending a second alternative message 2". The next step comprising sending the third message 3 from the first user device UE1 to the second user device UE2 might remain similar. The next step thereto that correspond to the fourth step of FIG. 1a, the second user device UE2 contacts the third server CS3 (e.g. by means of the DD comprising the link to the third server) to get the DCF with an alternative fourth message 4". The further steps might be performed similar to steps 3-7 as discussed under FIG. 1a.

In an alternative, a intermediate user device might be provided that receives the content from the first user device UE1 to be further distributed to further recipient devices device UE2; such distribution might also referred to as super distribution method. This alternative might be realized as a variation of the third exemplary embodiment as shown in FIG. 3 by formally replacing the third server CS3 by the intermediate user device. The first user device UE1 then uploads the DCF to the intermediate user device by sending the second alternative message 2''. Instead of steps three and four of FIG. 3, different means may be used to notify the second user device UE2 and to forward the DCF from the intermediate device to the second user device UE2, e.g. by means of Bluetooth, infrared, MMS or WLAN. The further steps might be performed similar to steps 5-7 as discussed above.

The embodiments disclosed above allow the user to control the usage of content of arbitrary size via its user equipment (e.g. the mobile phone) e.g. based on OMA DRM 1.0 separate delivery protection as described above.

Using OMA DRM 1.0 as a base, no modifications are necessary on the side of the receiving devices, provided that the receiving devices are OMA DRM 1.0 compliant. Thus, any OMA DRM 1.0 capable device (and thus most of recent mobile phones) is capable to separately receive protected content data and the usage rights data to enforce the usage rights of the content.

On the side of the sending devices, additional functionality may be realized by software modifications within the sending device. Thus, embodiments of the invention can be exploited without any need for modifications of OMA DRM 1.0.

In order to provide a certain level of security, the content might be encrypted within the first user device UE1. As discussed above, in order to render a DRM protected media object, the user requires both the encrypted content file itself and the associated RO containing the decryption key and rights description as described above. Depending on the level of trust that is to be achieved, there might be also an object to protect the RO from any misuse (capturing, amending, etc.). Thereto, the RO might be transmitted over a secure channel. Alternatively or additionally, the RO might be integrity-protected.

OMA DRM 2.0 proposes a secure delivery of the RO by establishing a trust relationship by the use of certificates. In this respect, OMA DRM 2.0 requires a public key infrastructure (PKI). Each entity in the system is provisioned with a public key and a corresponding private key. The public key is encapsulated within a certificate which is signed by a Certification Authority (CA). A trusted Online Certificate Status Protocol (OCSP) responder checks the certificate validity and gives the certificate status: good, revoked or unknown. The protected content can be delivered to the device by any means without the need for additional protection (e.g. over the air, WLAN, removable media, etc.). Similarly to OMA DRM 1.0, OMA DRM 2.0 does not address a peer-to-peer mechanism of control. In a peer-to-peer network (P2P), each peer acts as both a client and a server. When considering OMA DRM 2.0 for P2P communication in a mobile network, each mobile phone should be able to send and to receive DRM content, i.e. act as DRM Agent and Rights Issuer.

Public key cryptography as proposed by OMA DRM 2.0 for the exchange of Right Objects depends on prior knowledge of the public key of the receiving party to the sending party. Typically, private keys are embedded into certificates and, e.g. as in Rights Object Acquisition Protocol ROAP proposed by OMA DRM 2.0, exchanged during an initial registration phase. In a peer-to-peer scenario, exchange of certificates is not always possible, especially not if the receiving peer is offline at the point in time when the message shall be send. In this case, the message may be stored in the network, without knowledge of the receiving devices public key, the sending device can not protect the Right Objects to be sent to the receiving device.

As an alternative of certificate-based cryptography as proposed above, a so-called Identity-based management of digital rights (IB-DRM) is proposed. This rights management system might be based on OMA DRM 2.0, but relying on Identity-based Public Key Cryptography (ID-PKC). In ID-PKC schemes, the public key is derived from public information, e.g. a public identity like email address, phone number or SIP-URI. As a result, the encryption of data or authentication does not need any prior certificate exchange. Identity based encryption can e.g. be realized using elliptic curve cryptography with bilinear parings. According to the article of C. Gentry and A. Silverberg, "Hierarchical ID-Based Cryptography," *Proceedings of the 8th International Conference on the Theory and Application of Cryptology and Information Security: Advances in Cryptology*, pp. 548-566, 2002, a hierarchical identity-based encryption scheme yields a tree-structure architecture to IB-DRM similar to traditional PKI DRM systems, which provides security and scalability of the system. Moreover, key management is facilitated as keys can be derived from identity strings. In the IB-DRM system, the Rights Object (RO) can be delivered to the recipient using a one-pass protocol. Prior certificate exchange is not necessary and authentication and authorization can be done separately at any time. IB-DRM is thus suitable for P2P networks, as it is designed to be used in a push mode allowing a message, i.e. the RO, to be stored somewhere in a network.

DRM protection using IBE might comprise the following steps:

1. Basic cryptographic parameters are generated and (partly) published by Trusted Authorities (TAs), which might be organized in a hierarchy, provided that a plurality of TAs are present in the system.
2. Each communicating party acquires its private key from its respective TA. The key should be transferred using a secure channel, e.g. during the manufacturing process or using Transport Layer Security (TLS).
3. At a sending device, the content is encrypted and usage rights for this content are defined. At least the key used to encrypt the content is encrypted with the public key of the recipient device. The public key is derived from some public identity of the recipient (e.g. the telephone number, email address, etc) and system parameters published by the TAs, using identity-based public key cryptography schemes as explained above. The encrypted key and the defined usage rights are embedded into a RO, which is integrity protected or signed using the identity based signature of the sending device.
4. Both, content and usage rights are distributed to the receiving device. (additional protection against eavesdropping during this step might not be necessary).
5. The recipient device verifies the authenticity of the RO and decrypts the key which in turn can be used to decrypted the encrypted content.

Optionally, the validity of the key of the sending and/or receiving device may be checked in the above step 3 and/or step 5.

The IB-DRM system as proposed above provides a similar security level as OMA DRM 2.0, but offers more flexibility and simplicity. In particular, the Identity-based Rights Object Acquisition Protocol ROAP can be executed with only one message exchange. Authentication and authorization can actually be done separately at any time e.g. by contacting a dedicated node that determines whether an entity is trustworthy or not. The Identity-based ROAP is suitable for P2P networks, as it is designed to be used in the push mode. This means that the recipient peer does not have to request the content from the sending peer, which is the typical use case (in general, the recipient peer may not even know that the sending peer wants to send a message) and afterwards the sending peer needs not to be online, as only one message is exchanged.

The invention claimed is:

1. A method of supporting control of a content data object being associated with a content controlling terminal of a communications network and being received by a content receiving terminal, the method comprising:
   generating by the content controlling terminal the content data object;
   the content controlling terminal generating a digital rights data object associated with the content data object, wherein the digital rights data object is required when using the content of the content data object;
   uploading by the content controlling terminal only the content data object to a server;
   transmitting by the content controlling terminal a link to the content receiving terminal, the link comprising a download descriptor for the content data object;
   receiving by the content controlling terminal a request from the content receiving terminal to get the digital rights data object, wherein the content receiving terminal is in a peer-to-peer relationship with the content controlling terminal; and
   the content controlling terminal initiating a peer-to-peer direct transmission of the digital rights data object to the content receiving terminal, the digital rights data object being sent to the content receiving terminal in a message that is separate from another message that was sent by the content controlling terminal to the content receiving terminal that includes the link to the content data object.

2. The method of claim 1, wherein the content data object to be received by the recipient terminal comprises an information about the address of a control supporting server to be contacted for sending the request to get the digital rights data object.

3. The method of claim 1, further sending, in response to receiving the request, a request notification to the content controlling terminal in order to initiate the transmission of the digital rights data object from the content controlling terminal to the content receiving terminal.

4. The method of claim 3, wherein the request comprises information of an address of the content controlling terminal, the address being a telephone number; and an identifier of the requested digital rights data object, and wherein, as part of the request notification, said identifier is sent to the content controlling terminal using said address.

5. The method of claim 3, further comprising: retrieving a phone number of the receiving device from an IP address of the content receiving terminal comprised in the request, and inserting the retrieved phone number into the request notification so that the content controlling terminal is able to contact the content receiving terminal.

6. The method of claim 1, further comprising:
   receiving a content download request for sending the content data object to the content receiving terminal, and
   sending said content data object to said content receiving terminal.

7. The method of claim 6, wherein the content download request is received from one of the following: the content controlling terminal, the content receiving terminal, and a device associated to the content controlling terminal.

8. The method of claim 3, wherein at least one of the following applies:
   the request is generated according to the Hypertext Transfer Protocol (HTTP), and
   the request notification is generated as one or more messages according to the short message service (SMS).

9. A method of controlling a usage of a content data object by a content receiving terminal, comprising:
   generating a digital rights data object at a content controlling terminal that is in a peer-to-peer relationship with the content receiving terminal, wherein the content data object is associated with the content controlling terminal, and wherein the digital rights data object is associated with the content data object and is required when using the content of the content data object;
   receiving a notification to send the digital rights data object to the content receiving terminal; and
   sending the digital rights data object from the content controlling terminal to the content receiving terminal using a peer-to-peer direct transmission between the content controlling terminal and the content receiving terminal, the digital rights data object being transmitted to the content receiving terminal in a message generated by the content controlling terminal that is separate from another message that was sent by the content controlling terminal to the content receiving terminal that includes the link to the content data object.

10. The method of claim 9, wherein usage rights defined within the digital rights data object comprise one or more of the following restrictions:
    purpose binding,
    temporal restriction, and
    a maximum number of permitted usages.

11. The method of claim 9, further comprising:
    embedding a decryption key into the digital rights data object to be used in the content receiving terminal to decrypt the content data object.

12. The method of claim 11, further comprising:
    encrypting the decryption key with a public key of the content receiving terminal to be embedded into the digital rights data object.

13. The method of claim 12, wherein the public key of the content receiving terminal is generated using an address of the content receiving terminal, wherein the address includes one or more of the following: a telephone number, and an e-mail address.

14. The method of claim 9, further comprising:
    generating a download information to be sent to the content receiving terminal, wherein the download information enabling the content receiving terminal to download said content data object from an appropriate server.

15. The method of claim 14, wherein the download information comprises at least one of: a link to the content data object, an address of a server to be contacted to download the content data object, an information about the size of the content data object, and a type information specifying the type of the content data object.

16. A content controlling terminal for controlling a usage of a content data object received by a content receiving terminal, wherein the content controlling terminal is configured to perform the following:
    generate a digital rights data object, wherein the digital rights data object is associated with the content data object and is required when using the content of the content data object;
    receive a notification to send the digital rights data object to the content receiving terminal, wherein the content receiving terminal is in a peer-to-peer relationship with the content controlling terminal; and
    send the digital rights data object to the content receiving terminal using a peer-to-peer direct transmission between the content controlling terminal and the content receiving terminal, the digital rights data object being sent to the content receiving terminal in a message that is separate from another message that was sent by the content controlling terminal to the content receiving terminal that includes the link to the content data object.

* * * * *